(No Model.)

L. D. HASKELL, Jr.
THILL COUPLING.

No. 441,412. Patented Nov. 25, 1890.

Witnesses.
Geo. W. White
O. M. Jackson

Inventor.
Luther D. Haskell Jr.
by Alban Andrew
his atty.

UNITED STATES PATENT OFFICE.

LUTHER D. HASKELL, JR., OF SALEM, MASSACHUSETTS.

THILL-COUPLING.

SPECIFICATION forming part of Letters Patent No. 441,412, dated November 25, 1890.

Application filed June 28, 1889. Serial No. 315,943. (No model.)

*To all whom it may concern:*

Be it known that I, LUTHER D. HASKELL, Jr., a citizen of the United States, and a resident of Salem, in the county of Essex and State of Massachusetts, have invented new and useful Improvements in Thill-Couplings, of which the following, taken in connection with the accompanying drawings, is a specification.

This invention relates to improvements in thill-couplings, and it is carried out as follows, reference being had to the accompanying drawings, wherein—

Figure 1:
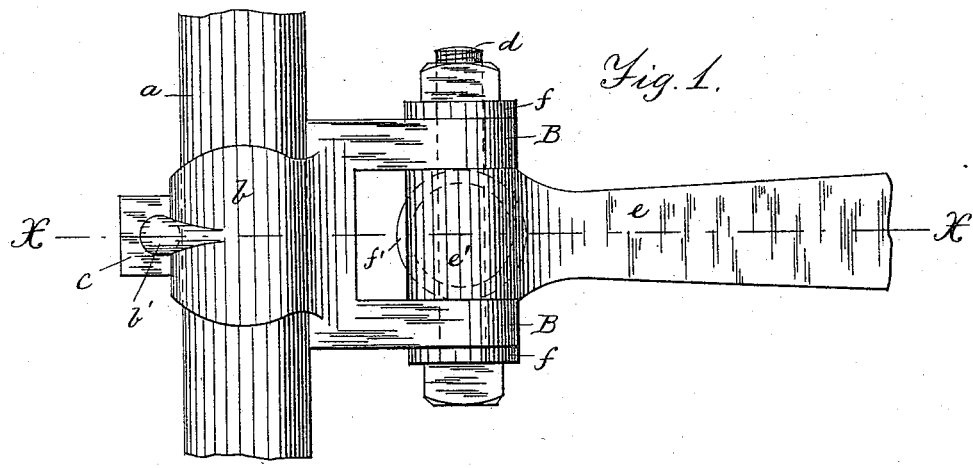
Figure 2:
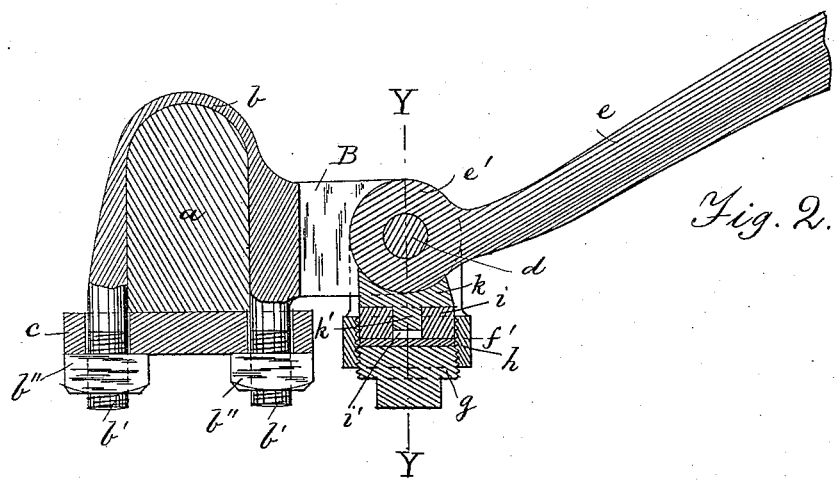
Figure 3:
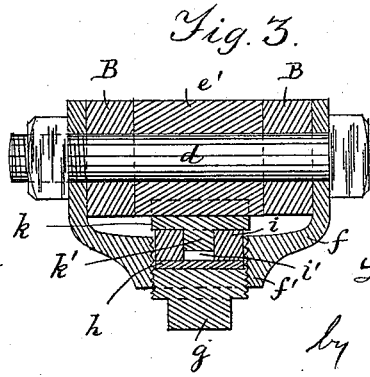

Figure 1 represents a plan view of the invention. Fig. 2 represents a longitudinal section on the line X X shown in Fig. 1, and Fig. 3 represents a cross-section on the line Y Y shown in Fig. 2.

Similar letters refer to similar parts wherever they occur in the different parts of the drawings.

$a$ is the axle, to which is secured the clasp $b$ by means of the screws $b'$ $b'$, nuts $b''$ $b''$, and yoke $c$ in the usual manner. In one piece with the clasp $b$ are made the perforated ears B B, between which is pivoted on the bolt $d$ the eye $e'$ of the shaft-iron $e$, as usual. Outside of the ears B B is pivoted and suspended on the bolt $d$ the yoke $f$, as shown in the drawings. The yoke $f$ has in its lower end an internally-screw-threaded hub $f'$, into which is screwed from below the regulating-screw $g$, as shown in Figs. 2 and 3. On the top of the said screw $g$ is arranged a metal washer $h$, within the perforated hub $f'$ of the yoke $f$, as shown in Figs. 2 and 3, and on the top of said washer is located the perforated rubber packing $i$, having a central perforation $i'$.

$k$ is a friction-block, preferably made of composition metal and having its upper end made concave, so as to fit, or nearly so, the convexity of the shaft-eye $e'$, as shown. The under side of the block $k$ rests on the rubber packing $i$, and is provided with a projection $k'$, inserted in the perforation $i'$ of the rubber packing $i$, as shown in Figs. 2 and 3. It will thus be seen that by tightening the regulating-screw $g$ the rubber packing $i$ will be compressed more or less, as may be desired, causing the friction-block $k$ to be held against the eye $e'$ of the shaft-iron $e$, by which the rattling of the joint is prevented.

As the rubber packing is confined between the block $k$ and the washer $h$, it will be seen that no wear or chafing occurs on said packing, and consequently its life and durability is materially increased over and above those in which a rubber packing bears directly against the shaft-eye.

If so desired, the metal washer $h$ may be dipensed with without departing from the essence of my invention; but in practice I prefer to use it, as it will permit the adjustment of the regulating-screw $g$ without chafing or twisting the rubber packing $i$.

A great advantage of this device is that it can be applied to the usual thill-couplings without any alteration except the substitution of a slightly longer bolt $d$ to compensate for the thickness of the perforated ears of the yoke $f$, as shown in Figs. 1 and 3.

Having thus fully described the nature, construction, and operation of my invention, I wish to secure by Leters Patent and claim—

The herein-described improved thill-coupling, consisting of the ears B B, secured to the axle, and the shaft-iron pivoted to said ears, combined with the yoke $f$, pivoted to the bolt $d$, on which the shaft-iron is pivoted, said yoke having a screw-threaded hub $f'$ and a regulating-screw $g$ adjustable therein, a metal washer $h$, and a centrally-perforated annular rubber packing $i$, arranged within the screw-threaded hub $f'$, and a metal block $k$, interposed between the shaft-eye and said rubber packing and having a cylindrical projection $k'$, adapted to fit the perforation in said rubber packing, all arranged and combined substantially as and for the purpose set forth.

In testimony whereof I have signed my name to this specification, in the presence of two subscribing witnesses, on this 11th day of May, A. D. 1889.

LUTHER D. HASKELL, JR.

Witnesses:
ALBAN ANDRÉN,
MARY C. TORREY.